United States Patent [19]

Nayfa

[11] Patent Number: 4,463,479
[45] Date of Patent: Aug. 7, 1984

[54] GRIT SEAL FOR COTTON GIN ROLLER BAR

[76] Inventor: James E. Nayfa, 10310 Woodford Dr., Dallas, Tex. 75229

[21] Appl. No.: 361,607

[22] Filed: Mar. 26, 1982

[51] Int. Cl.³ ............................................. D01B 1/08
[52] U.S. Cl. ...................................... 19/48 A; 19/50; 19/55 R; 19/62 R
[58] Field of Search ............ 19/55 R, 50, 62 R, 62 A, 19/48 A, 48 R; 308/187.1

[56] References Cited

U.S. PATENT DOCUMENTS

| | | | |
|---|---|---|---|
| 348,900 | 9/1886 | Gardner | 19/62 A |
| 351,401 | 10/1886 | Ralston | 19/62 A |
| 438,035 | 10/1890 | Turner | 19/48 A |
| 1,003,327 | 9/1911 | Bullock | 19/48 R |
| 1,019,240 | 3/1912 | Fordyce | 19/59 |
| 1,031,703 | 7/1912 | Fordyce | 19/59 |
| 1,565,626 | 12/1925 | Doremus | 19/62 A |
| 3,369,275 | 2/1968 | Headley | 19/62 R |
| 3,694,857 | 10/1972 | Nayfa | 19/62 R |
| 3,971,565 | 7/1976 | Schickling et al. | 308/187.1 X |
| 4,348,067 | 9/1982 | Tooley | 308/187.1 |

Primary Examiner—Louis Rimrodt
Attorney, Agent, or Firm—Dennis T. Griggs

[57] ABSTRACT

A cotton gin bar including a roller assembly comprising a pair of discs rotatably arranged on the upper portion of the bar at the ginning point, the discs being operative on opposing sides of the bar for detaching lint from the seed. Each roller disc is provided with an annular rib and the gin bar is provided with an annular groove in which the rib is received, thereby defining a rotatable seal. The rotatable seal restricts the passage of small particles such as grit and lint which interfere with operation of the annular bearing on which the roller disc is mounted.

5 Claims, 11 Drawing Figures

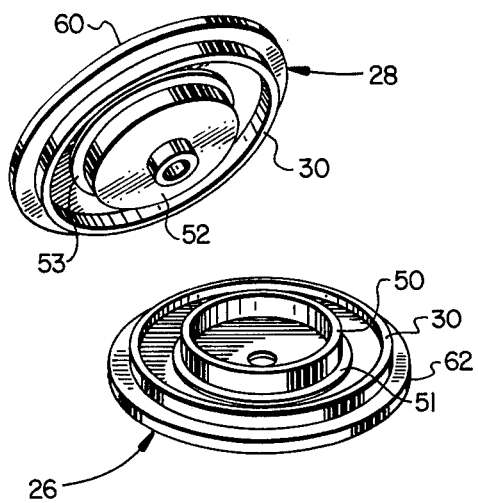
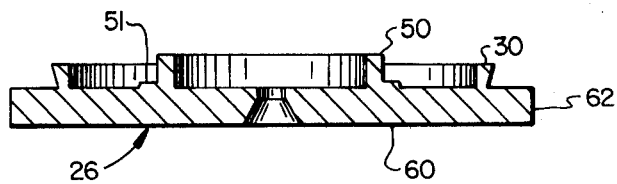
FIG. 5
FIG. 6
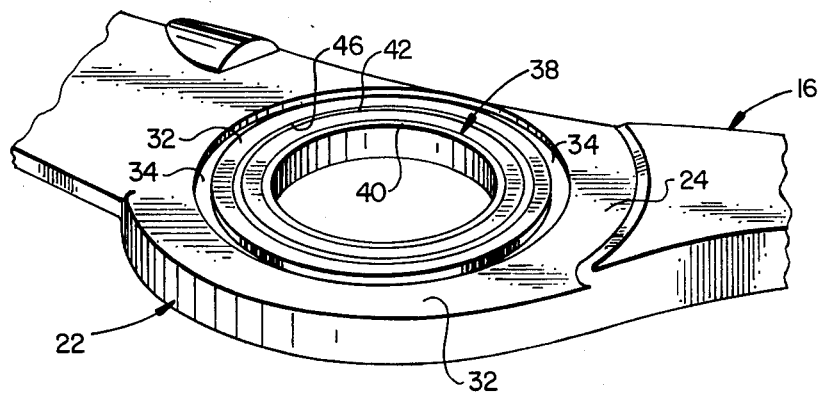
FIG. 7
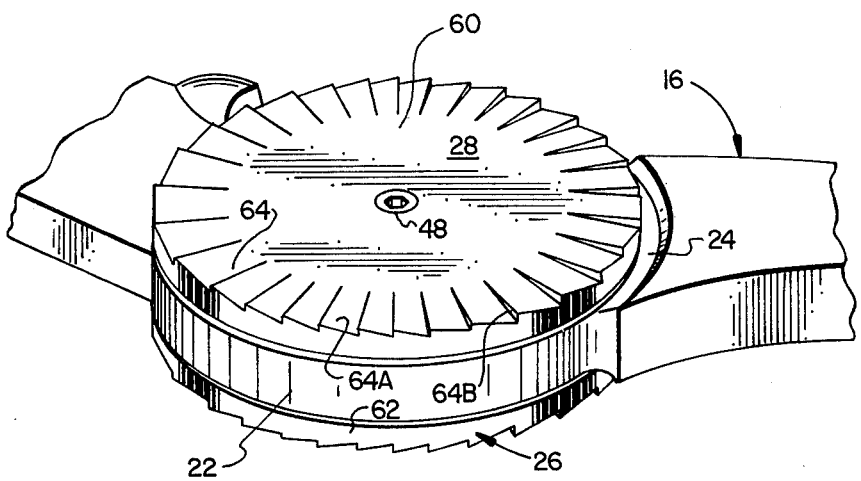
FIG. 8

GRIT SEAL FOR COTTON GIN ROLLER BAR

BACKGROUND OF THE INVENTION

1. Field of the Invention

This invention relates generally to cotton gins and in particular to an improved cotton gin roller bar.

2. Description of the Prior Art

The conventional cotton gin includes a series of circular saws arranged at relatively close spacings along a rotatable shaft, the saws operating between a series of gin bars spaced to provided minimum clearance for the saws and to permit passage of cotton fibers impaled on the saw teeth, and rejecting the seed as the lint fiber is detached therefrom. A limiting factor in the use of the gin bar and rotary saw blade combination is the excessive wear on the gin bar at the ginning point caused by the abrasive action of particulated material such as grit which clings to the cotton fibers. The resulting damage to the gin bar affects the quality of the cotton fibers by reducing their length.

Gin bar improvements are known wherein a freely rotatable roller disc is attached to the gin bar at the ginning point where fibers are pulled between adjacent gin bars by a rotary saw blade. The roller disc modification has greatly increased the output of the gin stand, while also improving the quality of the cotton by reducing fiber breakage and increasing the staple length.

The beneficial effect of the rotatable gin bar disc is provided by the rotational movement of the roller disc relative to the saw blade. The rolling action of the disc presents an ever-changing shear surface on which the seed and fiber can be pulled apart. The rolling movement of the disc also reduces the tensile forces acting on the cotton fibers, thereby reducing fiber breakage. It is important, therefore, that the roller disc turn freely as the cotton fiber is pulled by the rotatable saw.

The roller discs are press fitted into a sealed ball bearing assembly mounted on the gin bar. A factor which limits usage of the roller disc assembly is that grit, lint and other particulate material tends to accumulate between the inside face of the rotary disc and the stationary structure of the gin bar and the outer race of the annular roller bearing. The build-up of grit, lint and other particulate material restrains the free movement of the roller disc relative to the gin bar, thereby diminishing the beneficial effect of the roller disc. Further build-up of particulate material in the region between the roller disc and the gin bar will arrest movement of the roller disc and may cause seizure of the roller bearings.

OBJECTS OF THE INVENTION

It is, therefore, the principal object of the present invention to provide an improved gin bar having a rotatable seal interposed between the gin bar and a roller disc for preventing the build-up of grit and other particulate material in the interface region between the fixed gin bar and the rotatable roller disc.

A related object of the invention is to provide a rotatable grit seal for a cotton gin roller bar, operative parts of which can be interchangably incorporated into the gin bar and roller disc.

Yet another object of the invention is to provide an improved cotton gin roller bar for use in a conventional gin stand to insure maximum efficiency of a roller disc as it removes cotton fibers from seed while preventing the accumulation of particulate materials in critical regions between the roller disc and gin bar thereby assuring free rotation of the roller disc and providing for the efficient separation of fiber from the seed.

SUMMARY OF THE INVENTION

A cotton gin bar including a roller assembly comprising a pair of discs rotatably arranged on the upper portion of the bar at the ginning point, the discs being operative on opposing sides of the bar for detaching lint from the seed is disclosed. Each roller disc is provided with an annular rib and the gin bar is provided with an annular groove in which the rib is received, thereby defining a rotatable seal. The rotatable seal restricts the passage of small particles such as grit and lint which interfere with operation of the annular bearing on which the roller disc is mounted.

According to a preferred embodiment, the rotatable seal is enhanced by an annular bushing disposed in the interface region between the gin bar and the roller disc. The annular bushing is preferably constructed of a durable, pliant material such as nylon, and may be mounted either on the gin bar or on the roller disc. In the preferred arrangement, the annular bushing is disposed within the annular groove and is bonded onto the gin bar by an epoxy adhesive. The annular bushing is yieldable with respect to rotation of the roller disc, and serves as an effective barrier to the migration of particulate material into the critical interface region between the gin bar and the roller disc.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 5 is a perspective view of the roller discs shown in FIG. 2;

FIG. 6 is a sectional view of a roller disc;

FIG. 7 is a partial perspective view of a gin bar which reveals the annular roller bearing; and, FIG. 8 is a view similar to FIG. 7 which includes roller discs rotatably mounted onto the gin bar.

DETAILED DESCRIPTION OF THE PREFERRED EMBODIMENTS

Figure 1:
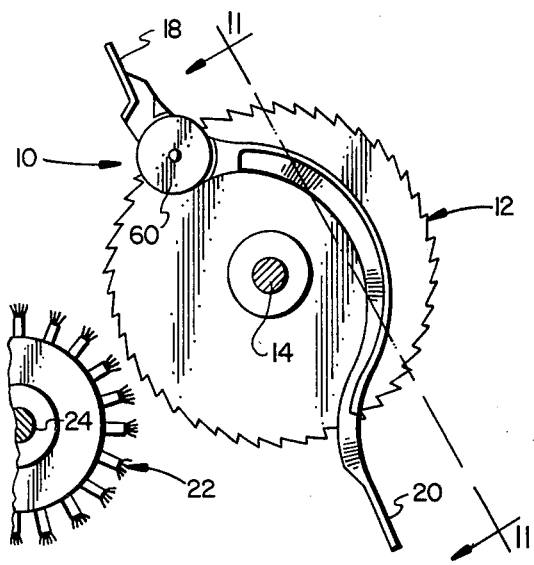
FIG. 1 is a side elevation view showing the relative positions of a gin bar, rotary saw and doffing brush as utilized in a gin stand.

In the description which follows, like parts are marked throughout the specification and drawings with the same reference numerals, respectively. The drawings are not necessarily to scale and in some instances proportions have been exaggerated in order to more clearly depict certain features of the invention.

Referring now to FIG. 1, the invention is embodied in a gin roller bar assembly 10 which is mounted adjacent a rotary saw blade 12. The saw blade 12 is secured to a rotatable shaft 14 in a gin stand (not shown). The gin roller bar assembly 10 includes an elongated, curved gin bar 16, at each end of which are attaching pads 18, 20 for securing the gin bar to supporting members in the gin stand. In the gin stand, an array of the gin roller bar assemblies 10 are installed in side-by-side spaced relation, in interleaved relationship with the rotary saw blade 12, as illustrated in FIG. 2.

The ginning point, or the point in which the teeth of the saw 12 pass between adjacent gin bars, occurs near the upper end of gin bar at its outer face. Cotton fibers impaled upon the teeth of the saw 12 are separated from the seed at this point, and are drawn between the gin bars 16 and are wiped from the saw teeth by a doffing brush 22. The doffing brush 22 is mounted for rotation on a shaft 24 within the gin stand. The cotton fiber is thereafter dispatched by suitable means to a bailing press (not shown).

Figure 2:
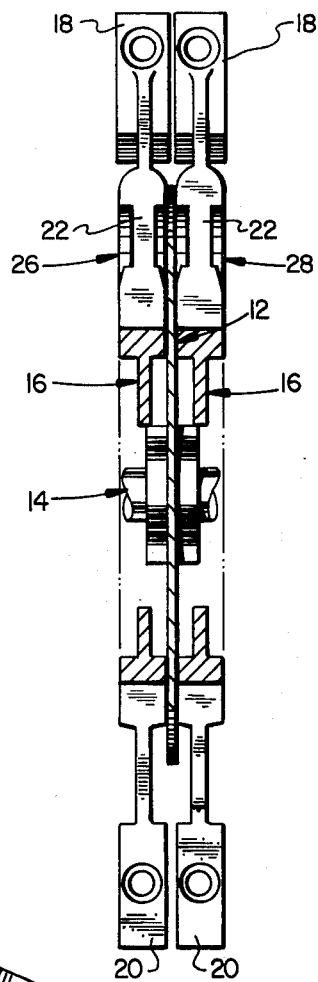
FIG. 2 is a sectional view of the gin bar and rotary saw taken to the lines II—II of FIG. 1.
Figure 3:
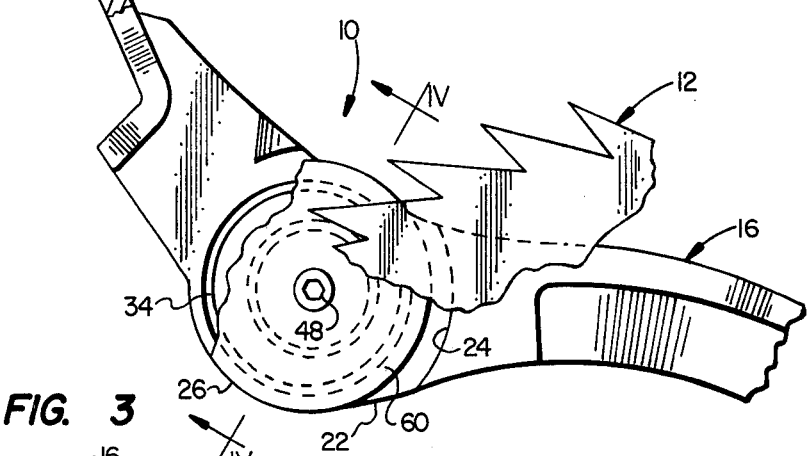
FIG. 3 is an enlarged fragmentary view of the upper portion of the gin bar shown in FIG. 1.

The body of the gin bar 16 is generally uniform in thickness, having a reduced thickness towards its lower end, as shown in FIG. 2, and has an enlarged width portion 22 near its upper end, the opposing faces of which are undercut, narrowing the thickness of the gin bar 16 outwardly toward its upper end, and defining a circular recess 24 on each side of the gin bar, as shown in FIGS. 1 and 7, to accomodate roller discs 26, 28 which are rotatably seated in each recess, respectively. Each recess 24 opens to the outer face of the gin bar to expose a portion of the periphery of the associated disc.

Referring now to FIGS. 5 and 7, each disc has an annular rib 30 concentrically formed on one face thereof. The face 32 of the recess 24 on the enlarged gin bar portion 22 is intersected by an annular groove 34 in which the annular rib 30 is received. The annular rib 30 is rotatable within the annular groove 34 thereby defining a rotary seal. The purpose of the rotary seal is to prevent particulate material such as grit from being accumulated in the interface region 36 (FIGS. 4A, 4B) between the fixed gin bar 16 and the rotatable discs 26, 28.

The roller discs 26, 28 are rotatably coupled to the gin bar 16 by an annular roller bearing assembly 38. The roller bearing assembly 38 includes an inner race 40, an outer race 42 and roller ball bearings 44 movably carried in the raceway defined by the inner and outer races. The enlarged portion 22 of the gin bar 16 is provided with a central bore 46 in which the annular bearing assembly 38 is secured by a press fit. The roller discs 26, 28 are likewise secured in a press fit against the inside bore of the inner race 40.

The roller discs 26, 28 are secured together within the inner race 40 by a threaded fastener 48. Each roller disc 26, 28 is provided with a press fit ring in the form of an annular boss 50 and annular boss 52, respectively, which are inserted into and received in binding engagement with the inner race 40. Each disc is provided with a small annular shoulder 51, 53, respectively, which bears against the opposite faces of the inner race 40 so that when they are brought together as shown in FIG. 4A and FIG. 4B, the interface clearance region 36 is established to permit the roller disc to rotate freely with respect to the gin bar 16.

The presence of the rotatable rib 30 within the annular groove 34 serves as a shield to prevent the migration of particulate material such as grit into the interface region 36.

Figure 4C:
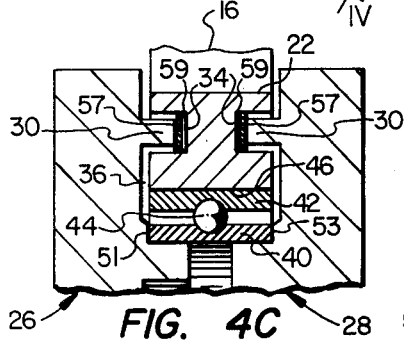
FIG. 4C is an enlarged, partial sectional view taken along the lines IV—IV of FIG. 3.
Figure 4D:
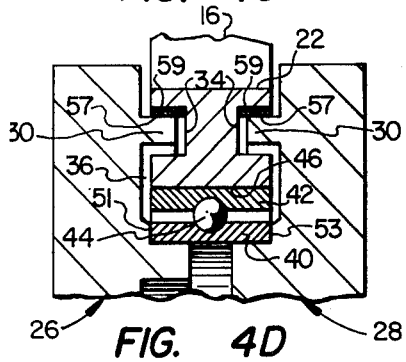
FIG. 4D is an enlarged partial sectional view similar to FIG. 4C.
Figure 4A:
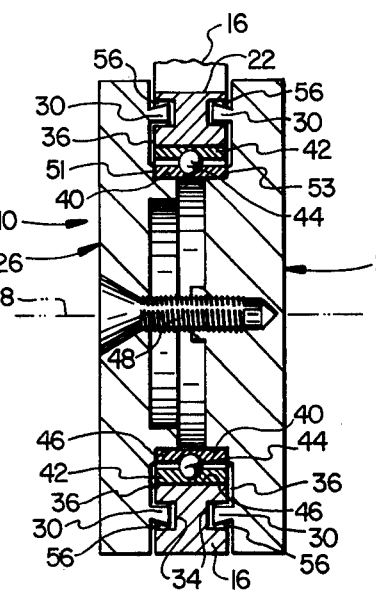
FIG. 4A is a sectional view of a preferred embodiment of the gin bar and roller disc combination shown in FIG. 3, taken along the lines IV—IV.

According to one aspect of the invention, an improved rotary seal is provided by beveling the outer sidewall 54 of the annular rib 30 as illustrated in FIGS. 4A and 6. The beveled sidewall surface 54 in combination with the sidewall of the annular groove 34 defines a small annular chamber 56 which serves as a lint trap. It has been discovered during gin stand testing that an annular body of cotton fiber will accumulate in the lint trap chamber 56. This annular body of cotton lint serves as a yieldable barrier which prevents the migration of grit and other particulate material into the critical interface region 36.

Figure 4B:
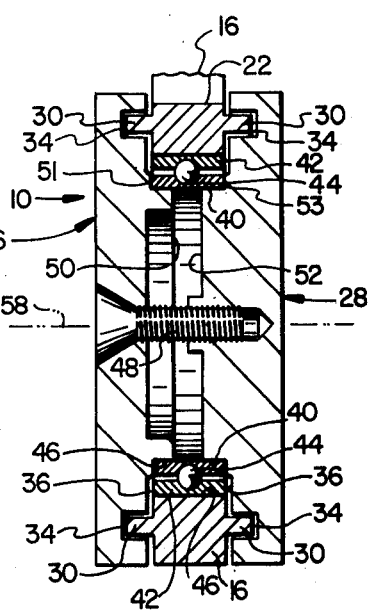
FIG. 4B is a sectional view similar to FIG. 4A which illustrates an alternate embodiment.

Referring now to FIG. 4B, the relative positions of the annular rib 30 and annular groove 34 are reversible, with the annular rib 30 being formed on opposite faces of the stationary gin bar 16, and the annular groove 34 being formed on the rotatable discs 26, 28. The embodiment shown in FIG. 4B provides the same rotary sealing effect as the structure shown in FIG. 4A. In each configuration, the annular ribs and annular grooves are coaxially aligned with the axis 58 of the roller bearing assembly.

Referring now to FIGS. 4C and 4D, the rotatable seal is enhanced by an annular bushing 57 disposed in the interface region between the gin bar 16 and the roller discs 26, 28. The annular bushing 57 is preferably constructed of a durable, pliant material such as nylon, and is preferably embodied in a fibrous weave. The annular bushing 57 may be mounted either on the gin bar 16 or on the roller discs 26, 28. In the preferred embodiment, the annular bushing 57 is disposed within the annular groove 34 and is bonded onto the gin bar by an epoxy adhesive 59. The annular bushing is yieldable with respect to rotation of the roller disc, and serves as an effective barrier to the migration of particulate material into the critical interface region between the gin bar and the roller disc.

While the annular bushing 57 is bonded to a sidewall surface of the annular groove 34 as illustrated in FIGS. 4C and 4D, good service can be achieved with the bushing bonded onto a side surface of the annular rib 30 (not illustrated). The structure to which the bushing 57 is bonded is machined to the appropriate depth for receiving the bushing and bonding material and so that there will be positive, non-binding engagement between the annular rib 30 and the bushing 57.

Two preferred constructions for the roller discs 30 are illustrated in FIGS. 5 and 8. In FIG. 5, the roller discs 26, 28 are characterized by a circular, planar face 60 (FIG. 1) and a smooth edge in the form of a cylindrical sidewall 62 as can best be seen in FIGS. 5 and 6.

An alternate embodiment for the roller discs 26, 28 is illustrated in FIG. 8. In this embodiment, each roller disc 26, 28 is characterized by a circular, planar face 60 and a smooth, cylindrical sidewall edge 62, with the exterior face 60 of each disc being intersected by radially extending serrations 64 thereby defining alternating lands and grooves 64A, 64B which in combination form an undulating outer periphery on the disc face 60. This undulating border on the disc face 60 substantially reduces the degree of friction which occurs at the ginning point, thereby eliminating much of the wear on the roller disc which would ordinarily result when the lint is pulled between the ribs.

In operation, seed cotton is impaled on the teeth of the saw 12 from a roller box (not shown) and is carried upwardly, the fibers being detached from the seed at the point at which the teeth enter between the saw blade and the roller discs. As the cotton fiber is pulled across the roller disc 24, much of the particulate material including grit is separated from the lint and is dropped out of the path of the gin fibers. Entry of cotton lint, grit and other particulate material into the critical interface region 36 is limited by operation of the rotary seal provided by the annular rib 30 and annular groove 34.

Although preferred embodiments of the invention have been described in detail, it should be understood that various changes, substitutions and alterations can be made therein without departing from the spirit and scope of the invention as defined by the appended claims.

What is claimed is:

1. Apparatus for use in a cotton gin comprising a gin bar and a roller disc rotatably mounted on said gin bar, characterized in that cooperating means are carried by said roller disc and by said gin bar defining a rotatable seal between said roller disc and said gin bar, said cooperating means including an annular rib carried by said roller disc, and said gin bar having an annular groove, said annular rib being received for rotation in said annular groove without touching said gin bar, wherein said annular rib is provided with an inner sidewall and an outer sidewall, said outer sidewall being beveled along an acute slope relative to the rotational axis of said roller disc, thereby defining an annular lint trap chamber.

2. Apparatus for use in a cotton gin comprising a gin bar and a roller disc rotatably mounted on said gin bar, characterized in that cooperating means are carried by said roller disc and by said gin bar defining a rotatable seal between said roller disc and said gin bar, said cooperating means including an annular rib carried by said gin bar, and said roller disc having an annular groove, said annular rib being received for rotation in said annular groove without touching said roller disc, wherein said annular rib is provided with an inner sidewall and an outer sidewall, said outer sidewall being beveled along an acute slope relative to the rotational axis of said roller disc, thereby defining an annular lint trap chamber.

3. Apparatus for use in a cotton gin comprising a gin bar and a roller disc rotatably mounted on said gin bar, said roller disc being characterized by a circular face and a smooth, cylindrical sidewall, the face of said disc being intersected by radially extending serrations thereby defining alternating lands and grooves.

4. In a cotton gin bar of the type having an annular roller bearing and a roller disc mounted on said roller bearing for rotation relative to said gin bar, the improvement comprising said gin bar having an annular rib coaxially aligned with said roller bearing, said roller disc having an annular groove coaxially aligned with said roller bearing, said annular being received for rotation within said annular groove without touching said roller disc, and including an annular bushing disposed in said annular groove in non-binding engagement with said annular rib.

5. In a cotton gin bar of the type having an annular roller bearing and a roller disc mounted on said roller bearing for rotation relative to said gin bar, the improvement comprising coacting male and female members carried by said roller disc and by said gin bar defining a rotatable seal between said roller disc and said gin bar, said male and female members being spaced with respect to each other thereby permitting free rotation of one member relative to the other without touching engagement, one of said seal members having an annular groove coaxially aligned with said roller bearing, and the other seal member having an annular rib coaxially aligned with said roller bearing, said annular rib being received within said annular groove, and including an annular bushing disposed in said annular groove, said annular bushing being bonded to one of said seal members and being disposed for wiping engagement with the other one of said seal members.

* * * * *